United States Patent [19]

Kiesling et al.

[11] 4,408,309
[45] Oct. 4, 1983

[54] TIME DELAYED RECORDING SYSTEM

[76] Inventors: Roy A. Kiesling, 97 Douglass Way, Atherton; Roy A. Kiesling, III, 50 Hayfields Rd., Portola Valley, both of Calif. 94025

[21] Appl. No.: 284,529

[22] Filed: Jul. 20, 1981

[51] Int. Cl.³ .............................................. G11B 5/86
[52] U.S. Cl. ........................................ 369/7; 369/53; 369/60; 360/7
[58] Field of Search ..................... 369/6, 7, 53, 19, 60, 369/2; 360/5, 7, 31, 13; 455/66, 344; 179/1 SW, 1 MN

[56] References Cited

U.S. PATENT DOCUMENTS

| 2,918,524 | 12/1959 | Hume | 358/185 |
| 3,028,454 | 4/1962 | Von Kohorn | 360/7 |
| 3,360,613 | 12/1967 | Cooper | 360/13 |
| 3,538,265 | 11/1970 | Keeler | 360/7 |
| 3,645,539 | 2/1972 | Jenkins | 360/7 |
| 3,812,530 | 5/1974 | Ikegami | 360/5 |

FOREIGN PATENT DOCUMENTS 730664  5/1955  United Kingdom .................... 360/7

Primary Examiner—Alan Faber
Attorney, Agent, or Firm—Phillips, Moore, Lempio & Finley

[57] ABSTRACT

A time delay apparatus has a multistate switch and a delay medium. The time delay apparatus is used in combination with a receiver/amplifier and a recording system. A continuous signal is switched from the receiver/amplifier to the delay medium when it is desired to store a selected portion of the continuous signal. By switching the continuous signal to the delay medium, a delay signal may be monitored so the decision to store the selected portion may be made ex post facto of its occurence. The delayed signal is then switched to the recording system to store the selected portion at the appropriate moment.

6 Claims, 4 Drawing Figures

TIME DELAYED RECORDING SYSTEM

DESCRIPTION

The present invention relates generally to recording apparatus and more particularly to a time delay apparatus for ex post facto recording of selected portions of continuous programming.

When making a permanent recording of programming from radio or television, it is desirable to eliminate commercials, announcements or the like from the recording to provide selected portions of such programming in a continuous sequence. In a common practice, the entire programming is recorded and subsequently edited to provide the continuous sequence. However, it is readily seen that such a practice is time consuming and requires duplicate or additional equipment and excess storage medium for the editing process.

There are well known techniques for the selected recording of continuous information. Of particular interest are devices which monitor the continuous information and reproduce such information after a selected delay time. An operator while listening to the continuous information will make a decision that the current subject matter of the information is to be permanently recorded, defining the selected portion of the information. The delayed information is then retrieved so that permanent recording of the information may commence ex post facto of the decision. A similar decision is made to end the selected information. Ideally, recording from the delayed information should avoid losing part of the selected information at the moment of making the decision to record, and adding unwanted information at the end of the selected portion. Depending on the nature of the continuous information, the selected time for delay may be several seconds to several minutes in which to make the decision to record. Examples of such devices may be found in the teachings of Ikegami (U.S. Pat. No. 3,812,530, issued May 21, 1974), Von Kohorn (U.S. Pat. No. 3,028,454, issued Apr. 3, 1962) and Hume (U.S. Pat. No. 2,918,524, issued Dec. 22, 1959).

A feature common to each of the above teachings is a continuous or endless loop of recording tape and a playback head, erasure head and a record head juxtaposed in the order stated along the direction of travel of the tape. The length and speed of travel of loop determines the delay time. The continuous information when recorded on the loop is available at the playback head after the delay time. The erasure head degausses the tape for high quality recording.

In operation of the device as taught by Ikegami, when a decision to record the information is made, a delayed reset timer is switched on, the timer being operatively connected to a tape recorder remote control terminal. The switching on of the timer commences the immediate recording of the available delayed information. Switching off of the timer ceases recording of the delayed information after the selected delay time has elapsed. However, the delayed information cannot be monitored by the operator and, consequently, the ability of the operator to make an appropriate decision within the selected delay time and to sychronize the switching of the timer with the delay time governs whether superfluous information is added to or desired information is deleted from the selected portion.

The operation of the Von Kohorn device, being similar to that of the Ikegami device, differs in that a plurality of switches are provided, each switch being associated with a different selected time delay. However, the Von Kohorn device even with a plurality of time delay increments available still requires the operator to successfully synchronize the decision making with the delay time.

Hume discloses a pair of audio time delay devices and a pair of video time delay devices, one audio delay device being associated with a different one of each video time delay device for monitoring a left and a right aspect of a scene such as for a television program. The time delay allows a director to select the left or the right aspect of the scene ex post facto of its occurrence. However, even the Hume device requires the director to synchronize his decision making with the provided time delay, otherwise further editing is required.

SUMMARY OF THE INVENTION

It is therefore an object of the present invention to provide a time delay device which allows the operator to monitor both the continuous information and the time delayed information.

It is a further object of the present invention to provide a time delay device adaptable for use with both audio and video equipment.

According to the present invention a time delay device includes a delay means for delaying the information for a selected time when applied thereto, and switch means defining a first, second, third and fourth switching state. Each switching state enables the operator to monitor the information, monitor the delayed information, or permanently record the delayed information.

DETAILED DESCRIPTION OF THE DRAWINGS

Figure 1:
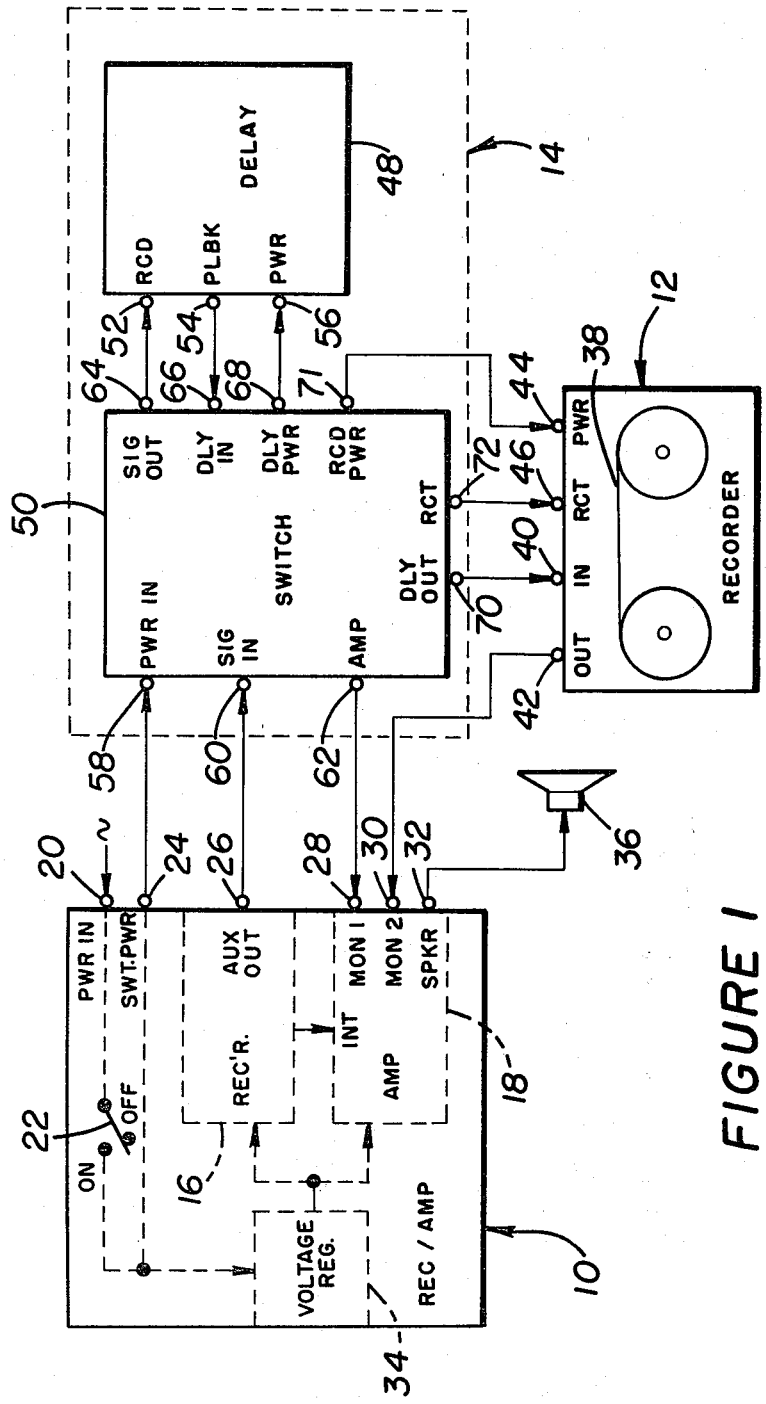
FIG. 1 is a schematic block diagram of an embodiment of a time delay device according to the principles of the present invention as would be used with home entertainment equipment.

Referring now to FIG. 1, there is shown a receiver system 10, a recording system 12 and a time delay apparatus 14 according to the principles of the present invention as hereinafter described.

Receiver system 10 may generally include a receiver portion 16, an amplifier portion 18, a power input (PWR IN) terminal 20 for application of an AC power signal, an off-on switch 22, a switched power output (SWT PWR) terminal 24, an auxiliary output (AUX OUT) terminal 26 operatively connected to receiver portion 16, a first and a second monitor input (MON 1, MON 2) terminals 28 and 30 operatively connected to amplifier portion 18, a speaker output (SPKR) terminal 32, and a voltage regulator 34.

When off-on switch 22 is in the on position, the power signal is applied to voltage regulator 34 and switch power output terminal 24. Voltage regulator 34 applies a DC power signal to each of receiver portion 16 and amplifier portion 18 to make each of them operational. In a conventional manner, receiver portion 16 develops a continuous signal at auxiliary output terminal 26 and also internally applies the continuous signal to amplifier portion 18. An operator of receiver system 10 may choose between the three inputs (INT, MON 1, MON 2) to amplifier portion 18. Receiver system 10 may further include a speaker 36 coupled to speaker output terminal 32 for application of an amplified signal developed by amplifier portion 18. The terminal connections hereinabove described with reference to receiver system 10 are generally found in many commercially available receiver/amplifier system for audio entertainment.

Recording system 12 may generally include a storage medium 38, a signal input (IN) terminal 40, a signal output (OUT) terminal 42, a power input (PWR) terminal 44 and a remote control input (RCT) terminal 46. Signal input terminal 40 is operatively coupled in a conventional manner to storage medium 38 for recording signals applied thereto. Signal output terminal 42 is operatively coupled in a conventional manner to storage medium 38 for playing back signals previously recorded in storage medium 38. A power signal applied to power input terminal 44 makes recording system 12 operational. Remote control input terminal 46 is coupled to a driving mechanism (not shown) for activating storage medium 38 when the power signal is applied to each of power input terminal 44 and remote control input terminal 46.

Each of receiver system 10 and recording system 12 have been generally described. The details of operation and construction of each is well known in the art and does not form a part of the present invention.

Time delay apparatus 14 enables the operator to select ex post facto a portion of the continuous signal and store the portion in storage medium 38. Time delay apparatus 14 includes delay means 48 for delaying by a selected time the continuous signal when made responsive thereto and operative to develop a delayed signal, and switch means 50 defining a first, second, third and fourth switching state, as hereinafter described.

Delay means 48 includes a record input (RCD) terminal 52, a playback output (PLBK) terminal 54 and a power input (PWR) terminal 56. As hereinafter described, a signal applied to record input terminal 52 is made available after the selected delay time at playback output terminal 54.

Switch means 50 includes a power input (PWR IN) terminal 58, a signal input (SIG IN) terminal 60, an amplifier output (AMP) terminal 62, a signal output (SIG OUT) terminal 64, a delayed signal input (DLY IN) terminal 66, a delay power output (DLY PWR) terminal 68, a delayed signal output (DLY OUT) terminal 70, a recorder power output (RCD PWR) terminal 71 and a remote control output (RCT) terminal 72.

Switched power output terminal 24 is coupled to power input terminal 58. Auxiliary output terminal 26 is coupled to signal input terminal 60. Amplifier output terminal 62 is coupled to first monitor input terminal 28. Signal output terminal 64 is coupled to record input terminal 52. Playback output terminal 54 is coupled to delay input terminal 66. Delay power output terminal 68 is coupled to power input terminal 56 of delay means 48. Delayed signal output terminal 70 is coupled to signal input terminal 40 of recording system 12. Recorder power output terminal 71 is coupled to power input terminal 44 of recording system 12. Remote control output terminal 72 is coupled to remote control input terminal 46. Signal output terminal 42 is coupled to second monitor input terminal 30.

In the first state switch means 50 couples auxiliary output 26 to first monitor input terminal 28 for application of the continuous signal to amplifier portion 18. Internally within switch means 50, signal input terminal 60 is directly coupled to amplifier output terminal 62. The first state additionally defines an off mode for time delay apparatus 14. In the off state the operator is utilizing receiving system 10 by itself and the connection between receiver portion 16 and amplifier portion 18 for application of the continuous signal may either be done internally or through switch means 50 in the first state. Additionally, prerecorded material may be played from recording system 12 by choosing at receiving system 10 second monitor input terminal 30 to amplifier portion 18.

In the second state, the switch means 50 couples auxiliary output terminal 26 to each of first monitor input terminal 28 and record input terminal 52 for application of the continuous signal to each of amplifier portion 18 and delay means 48. Switch means 50 further couples switched power output terminal 24 to power input terminal 56 for application of the power signal to delay means 48 to make delay means 48 responsive to the continuous signal. In the second state, or idle mode, the operator is monitoring the present continuous signal and recording the same in delay means 48. Internally within switch means 50, signal input terminal 60 is coupled to each of amplifier output terminal 62 and signal output terminal 64, power input terminal 58 being coupled to power output terminal 68. In the idle mode, the operator is monitoring the continuous signal in anticipation of a decision to select a portion of the continuous signal for storing in recording system 12.

After the operator has made such a decision, switch means 50 is placed in the third state, also defining a standby mode. In the third state, switch means 50 couples auxiliary output terminal 26 to record input terminal 52 for application of the continuous signal to delay means 48, further couples switch power output terminal 24 to each of power input terminal 56 of delay means 48 and power input terminal 44 of recording system 12 for making delay means 48 responsive to the continuous signal and preparing recording system 12 for storage of the selected portion, and further couples playback output terminal 54 to first monitor input terminal 28 and input terminal 40 for application of the delay signal to each of amplifier portion 18 and storage medium 38. Internally within switch means 50, power input terminal 58 is coupled to each of delay power output terminal 68 and recorder output terminal 71, signal input terminal 60 is coupled to signal output terminal 64, delay input terminal 66 is coupled to each of amplifier output terminal 62 and delayed signal output terminal 70. The operator when placing switch means in the third state or standby mode is now monitoring the delayed signal subsequent to making a decision to store a selected portion of the continuous signal. By monitoring the delayed signal the operator may now choose the exact moment in time to begin recording of the selected portion.

In the fourth state, also defining a record mode, switch means 50 couples switched power output terminal 24 to each of power input terminal 56 of delay means 48, power input terminal 44 of recording system 12 and remote control input terminal 46 for application of the power signal to each of delay means 48 and recording system 12 for making delay means 48 responsive to the continuous signal, further couples auxiliary output terminal 26 to record input terminal 52 for application of the continuous signal to delay means 48, and further couples playback terminal 54 to each of first monitor input terminal 28 and input terminal 40 of recording system 12 for application of the delay signal to each of amplifier portion 18 and storage medium 38. Internally within switch means 50, power input terminal 58 is coupled to each of delay power output terminal 68, recorder power output terminal 71 and remote control output terminal 72; signal input terminal 60 is coupled to signal output terminal 64; delayed signal input terminal 66 is coupled to each of amplifier output terminal 62 and delayed signal output terminal 70. In the record mode, the operator may monitor the delayed signal concurrently with its being stored in recording system 12. Alternatively, in the record mode the operator may monitor the undelayed continuous signal through the INT input to amplifier portion 18 in anticipation of terminating recording of the delayed signal at the appropriate moment. When the operator decides to end the selected portion he merely returns switch means 50 to any of the first, second or third states. Should the operator return switch means 50 to the second state, the process of monitoring the continuous signal to make a determination to store yet another selected portion of the continuous signal may begin anew by following the above-described teachings.

Figure 2:
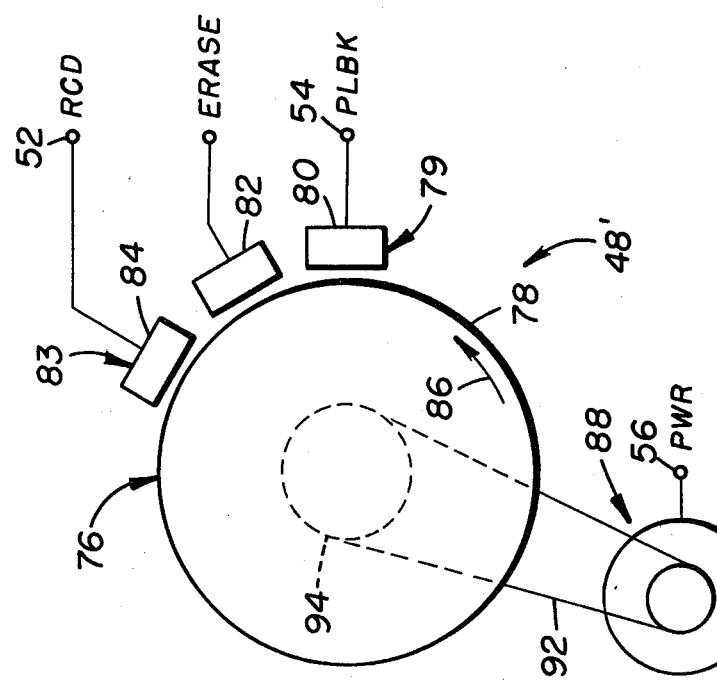
FIG. 2 is one embodiment of the delay means of FIG. 1.

Referring now to FIG. 2, there is shown one embodiment 48' of delay means 48. In the FIG. 2 embodiment, delay means 48' includes a member 76, either disk or drum shaped, having on its periphery a layer 78 of ferromagnetic material. Delay means 48' further includes playback means 79 such as a conventional playback head 80 operatively connected to playback output terminal 54, a conventional erase head 82 for degaussing ferromagnetic layer 78 and record means 83 such as a conventional record head 84 operatively connected to record input terminal 52, each head being juxtaposed in the order stated in the direction of travel of member 76 as shown by an arrow 86. Delay means 48 further includes driving means 88 responsive to the power signal applied to power input terminal 56 and operative to rotate member 76 in the direction of arrow 86. Typically, driving means 88 may include an electric motor 90, a drive belt 92 driven by motor 90 and a pulley 94 coaxially mounted on member 76 and driven by drive belt 92.

The selected delay time is chosen by selecting the angular velocity of member 76 the diameter of drum 76 and the circumferential spacing of playback head 80 relative to record head 84.

Figure 3:
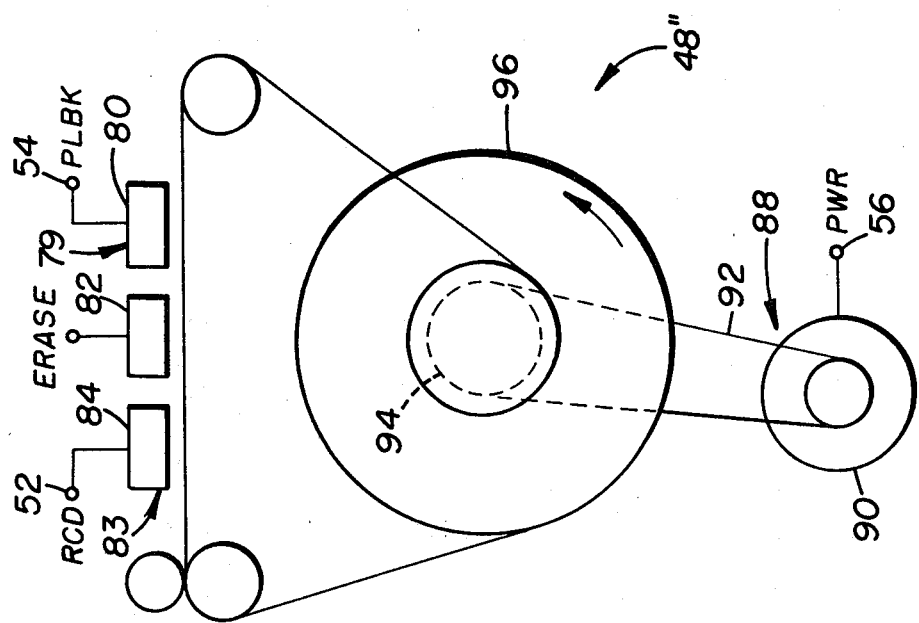
FIG. 3 illustrates an alternate embodiment of the delay means of FIG. 1.

Referring now to FIG. 3, there is shown yet another embodiment 48'' of delay means 48. In the FIG. 3 embodiment, delay means 48'' includes an endless recording tape loop 96 having ferromagnetic material thereon, as well as the elements having similar reference numbers as hereinabove described in reference to FIG. 2. Driving means 88 drives loop 96 in the direction as shown by an arrow 98. As is well known in the art, hoop 96 may be drawn from the center of the loop while it is wound on the perimeter. The selected time is chosen by the length of loop 96 and its relative rate of motion.

Figure 4:
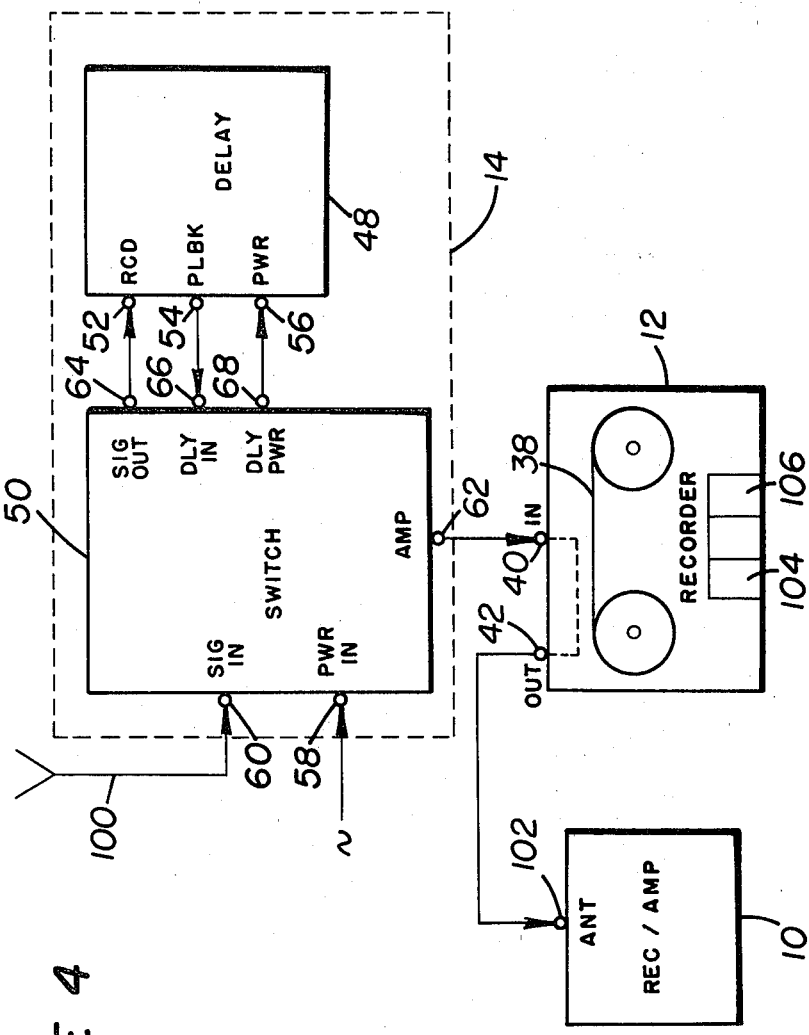
FIG. 4 is a schematic block diagram of an alternate embodiment of a time delay device according to the principles of the present invention.

Referring now to FIG. 4, there is shown an alternate arrangement of receiving system 10 further having an antenna input (ANT) terminal 102, recording system 12 and time delay apparatus 14. An antenna 100 is coupled to signal input 60 of switch means 50 for application of the continuous signal. Amplifier output terminal 62 is coupled to each of input terminal 40 of recording system 12 and antenna input terminal 102 of receiver system 10. Recording system 12 further includes, inter alia, a record switch 104 and a pause switch 106. All other elements having like reference numerals to FIG. 1 and their respective interconnections have been heretofore described therein. However, in the FIG. 4 embodiment, input terminal 40 and output terminal 42 are internally connected within recording system 12, except when recording system 12 is in a playback mode.

In the first state, switch means 50 couples antenna 100 to each of input terminal 40 and antenna input terminal 102, signal input terminal 60 being coupled to amplifier output terminal 62. The operator, when switch means 50 is in the first state or off mode, is monitoring the continuous signal.

In the second state, switch means 50 couples antenna 100 to each of input terminal 40, antenna input terminal 102 and record input terminal 52, signal input terminal 60 being coupled to each of signal output terminal 64 and amplifier output terminal 62. Internally within switch means 50, power input terminal 58 is coupled to delay power output terminal 68 for application of the power signal to power input terminal 56 of delay means 48. The operator, when switch means 50 is in the second state or standby mode, is monitoring the continuous signal in anticipation of making a decision to store a selected portion thereof.

Switch means 50, in the third state, or standby mode, couples antenna 100 to record input terminal 52, signal input terminal 60 being coupled to signal output terminal 64. Switch means 50 further couples playback output terminal 54 to each of input terminal 40 and antenna input terminal 102, delay input terminal 66 being coupled to amplifier output terminal 62. Internally within switch means 50 power input terminal 58 is coupled to delay power output terminal 68 for application of power signal to power input terminal 56. The operator, when switch means 50 is in the third state, is now monitoring the delayed signal available from delay means 48.

In the FIG. 4 embodiment, switch means 50 does not require a fourth state. While the operator is monitoring the delayed signal to determine when the selected portion is to begin, recording system 12 has record switch 104 and pause switch 106 depressed so that recording system 12 is in a record mode; however, storage medium 38 is not activated. Releasing pause switch 106 at the proper moment will commence recording of the selected portion in storage medium 38.

Although not intended to be a limitation on the principles of the present invention, the arrangement of FIG. 1 is preferred when receiver system 10 is an audio system and delay means 48 is the embodiment shown in FIG. 2. The selected delay time for an audio system may generally be approximately 5 to 10 seconds. The arrangement of FIG. 4 is preferred where receiver system 10 is a video system such as a television. Recording system 12 may be any commercially available video cassette recorder. Delay means 48 is preferably the embodiment shown in FIG. 2 when using the video system. The selected delay time for a video system may generally be 15 to 20 minutes.

Although the present invention has been described with reference to a particular embodiment thereof, those skilled in the art may now make numerous uses of and modifications to the present invention without departing from the inventive concepts disclosed herein. The present invention is to be limited only by the scope of the appended claims.

We claim:

1. For a receiver system having a receiver portion, an amplifier portion, a switched power output terminal, an auxiliary output terminal and a monitor input terminal, and a recording system having storage medium, a signal input terminal, a power input terminal and a remote control input terminal, said receiver portion developing a continuous signal at said auxiliary output terminal, said monitor input terminal being operatively connected to said amplifier portion, said signal input terminal being operatively connected to said storage medium, said remote control input terminal being operative to activate said storage medium when said power signal is applied to each of said power input terminal and said remote control input terminal, a time delay apparatus for ex post facto selecting a portion of said continuous signal and storing said portion in said storage medium, said time delay apparatus comprising:

delay means for delaying said continuous signal for a selected time when said delay means is made responsive to said continuous signal and operative to develop a delayed signal; and switch means defining a first, second, third and fourth switching state;

in said first state, said switch means being for coupling said auxiliary output terminal to said monitor input terminal for application of said continuous signal to said amplifier portion;

in said second state said switch means being for coupling said auxiliary output terminal to each of said monitor input terminal and said delay means for application of said continuous signal to each of said amplifier portion and said delay means, and further for coupling said switched power output terminal to said delay means for application of said power signal to said delay means to make said delay means responsive to said continuous signal;

in said third state said switch means being for coupling said auxiliary output terminal to said delay means for application of said continuous signal to said delay means, further for coupling said switched power output signal to each of said delay means and said power input terminal for making said delay means responsive to said continuous signal and preparing said recording system for storage of said portion, and further for coupling said delay means to each of said monitor input terminal and said signal input terminal for application of said delay signal to each of said amplifier portion and said storage medium; and in said fourth state said switch means being for coupling said auxiliary output terminal to said delay means for application of said continuous signal to said delay means, for coupling said switch power output terminal to each of said delay means, said power input terminal and said remote control input terminal for application of said power signal to each of said delay means and said recording system for making said delay means responsive to said continuous signal, and for coupling said delay means to each of said monitor input terminal and said signal input terminal for application of said delayed signal to each of said amplifier portion and said storage medium, said power signal being applied to each of power input terminal and said remote control input terminal for commencing storage of said portion of said continuous signal.

2. A time delay apparatus according to claim 1 wherein said delay means includes:

a drum shaped member having a layer of ferromagnetic material disposed on the periphery of said drum shaped member;

driving means responsive to said power signal and operative to rotate said drum shaped member about an axis thereof;

record means responsive to said continuous signal and operative to store said continuous signal in said ferromagnetic material defining a storage signal; and playback means responsive to said stored signal and operative to develop said delay signal, said playback means and said record means being proximately disposed in such order in the direction of rotation of said drum shaped member.

3. A time delay apparatus according to claim 1 wherein said delay means includes:

a continuous loop having ferromagnetic material thereon;

driving means responsive to said power signal for driving said continuous loop;

record means responsive to said continuous signal and operative to store said continuous signal in said ferromagnetic material, defining a storage signal; and playback means responsive to said storage signal and operative to develop said delay signal, said playback means and said record means being proximately disposed in such order in the direction of travel of said continuous loop.

4. For a receiver system having an antenna input terminal, and a recording system having a signal input terminal, a signal output terminal, and a recording medium, and an antenna for developing a continuous signal, said antenna input terminal being coupled to said signal output terminal, said signal output terminal being normally coupled to said signal input terminal internally within said recording system, said recording medium being operatively connected to said signal input terminal, a time delay apparatus for ex post facto selecting a portion of said continuous signal and storing said portion in said storage medium, said time delay apparatus comprising:

delay means for delaying said continuous signal for a selected time when said delay means is made responsive to said continuous signal and operative to develop a delayed signal; and switch means defining a first, second and third switching state;

in said first state said switch means being for coupling said antenna to said signal input terminal for application of said continuous signal to said antenna input terminal of said receiver system;

in said second state said switch means being for coupling said antenna to each of said delay means and said signal input terminal for application of said continuous signal to each of said delay means and said antenna input terminal of said receiver system, and further for making said delay means responsive to said continuous signal; and in said third state said switch means being for coupling said antenna to said delay means for application of said continuous signal to said delay means and further for making said delay means responsive to said continuous signal, and for coupling said delay means to said signal input terminal for application of said delayed signal to said recording system.

5. A time delay apparatus according to claim 4 wherein said delay means includes:
   a drum shaped member having a layer of ferromagnetic material disposed on the periphery of said drum shaped member and being rotated about an axis thereof;
   record means responsive to said continuous signal and operative to store said continuous signal in said ferromagnetic materials defining a storage signal; and
   playback means responsive to said storage signal and operative to develop said delay signal, said playback means and said record means being proximately disposed in such order in the direction of rotation of said drum shaped member.

6. A time delay apparatus according to claim 4 wherein said delay means includes:
   a continuous loop having ferromagnetic material thereon and being driven about an axis thereof;
   record means responsive to said continuous signal and operative to store said continuous signal in said ferromagnetic material, defining a stored signal; and
   playback means responsive to said stored signal and operative to develop said delayed signal, said playback means and said record means proximately disposed in such order in the direction of movement of said continuous loop.

* * * * *